United States Patent [19]

Audenard et al.

[11] 4,423,634

[45] Jan. 3, 1984

[54] DEVICE FOR THE ACTIVATION OF AN APPARATUS FOR MEASURING ACOUSTIC EMISSION BY DETECTION OF BACKGROUND NOISE

[75] Inventors: Bernard Audenard; Jean Marini, both of Paris, France

[73] Assignee: CGR, Paris, France

[21] Appl. No.: 280,355

[22] Filed: Jul. 6, 1981

[30] Foreign Application Priority Data

Jul. 8, 1980 [FR] France .............................. 80 15157

[51] Int. Cl.³ ...................... G01N 29/00; G01H 1/00; G01D 7/00
[52] U.S. Cl. ....................................... 73/587; 73/593; 73/801; 73/613
[58] Field of Search .................. 73/587, 801, 613, 593

[56] References Cited

U.S. PATENT DOCUMENTS

| | | | |
|---|---|---|---|
| 3,208,268 | 9/1965 | Tallian et al. | 73/593 |
| 3,400,578 | 9/1968 | Frarey et al. | 73/593 X |
| 3,435,406 | 3/1969 | McCauley | 73/613 |
| 3,699,806 | 10/1972 | Weichbrodt | 73/593 |
| 3,713,127 | 1/1973 | Keledy et al. | 73/587 X |
| 3,841,144 | 10/1974 | Baldwin | 340/610 X |
| 3,911,734 | 10/1975 | Mehdizadeh | 73/801 |
| 4,107,981 | 8/1978 | Kanagawa | 73/801 |
| 4,111,035 | 9/1978 | West | 73/35 |
| 4,165,458 | 8/1979 | Koizumi et al. | 235/92 TF |
| 4,198,866 | 4/1980 | Birjukou et al. | 73/613 |

FOREIGN PATENT DOCUMENTS

| | | | |
|---|---|---|---|
| 532806 | 10/1976 | U.S.S.R. | 73/801 |
| 534687 | 3/1977 | U.S.S.R. | 73/801 |
| 603893 | 4/1978 | U.S.S.R. | 73/801 |
| 659947 | 4/1979 | U.S.S.R. | 73/801 |

OTHER PUBLICATIONS

Acoustic Emission in the Frequency Domain; L. J. Graham & Allers; Conference monitoring Structural Integrity by AE; Fort Lauderdale, Fla. USA Jan. 17,18, 1974, also American Society for Testing Materials, 1975, pp. 11-39, ASTM STP571.

Electromagnetic Detection of AE from a Martensite Transformation, by B. W. Maxfield, Materials Eval., vol. 31, No. 2 Feb. 1973.

Acoustic Emission System for Monitoring Comp. in Fatique Noise Environment, Materials Eval. May, 1977, pp. 59-63, by C. R. Horak, sheet 213 dated 10/20/82.

Acoustic Emission Monitoring System for Detection of Cracks in a Complex Structure, by Yosio Nakamura, Mater. Eval. vol. 29, No. Jan. 1971, p. 8.

On-lie data Acquisition System for Acoustic Emission Signals by H. A. Duncan and A. L. Anderson, Rev. of Sci. Intrum. 51(3) Mar. 1980, pp. 278-284.

Primary Examiner—Anthony V. Ciarlante
Assistant Examiner—David V. Carlson
Attorney, Agent, or Firm—Cushman, Darby & Cushman

[57] ABSTRACT

An apparatus for measuring acoustic emission is activated only at critical periods which are determined by detection of the background noise from a reference level. An acoustic emission transducer continuously transmits a signal to a detection circuit which delivers the top modulation envelope of the background noise to a comparator at a reference level delivered by a control unit.

When a mean level of the background noise does not exceed a threshold reference level the AE is sampled at a low rate, f. When the background noise exceeds the threshold reference level the data sampling unit is activated to sample AE at a much higher rate F. Therefore AE is sampled at a high rate only when the pump or other machine under test is running and at a low rate when the article under test is not operating. The AE testing device also includes a frequency spectrum correlator which allows background noise to activate the increased sampling rate only if the noise is in a given frequency range.

5 Claims, 2 Drawing Figures

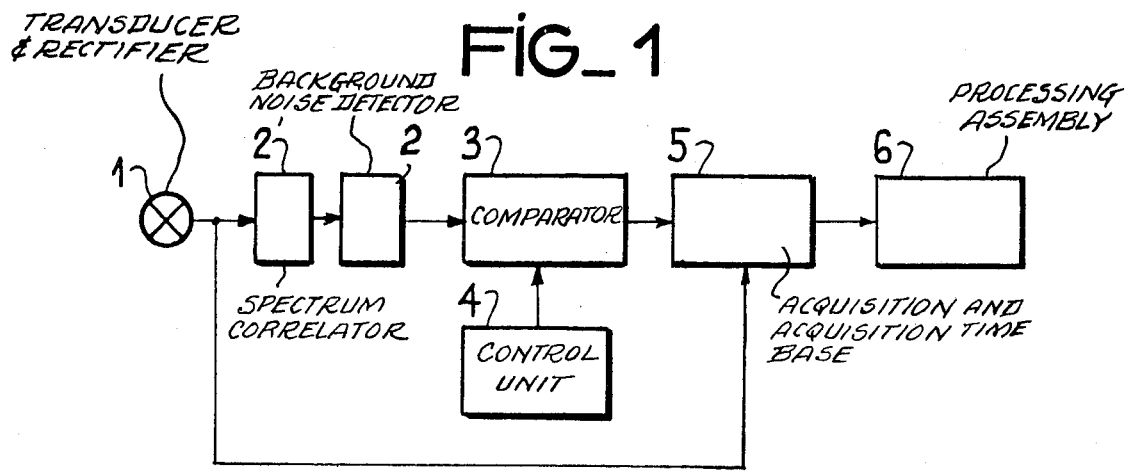
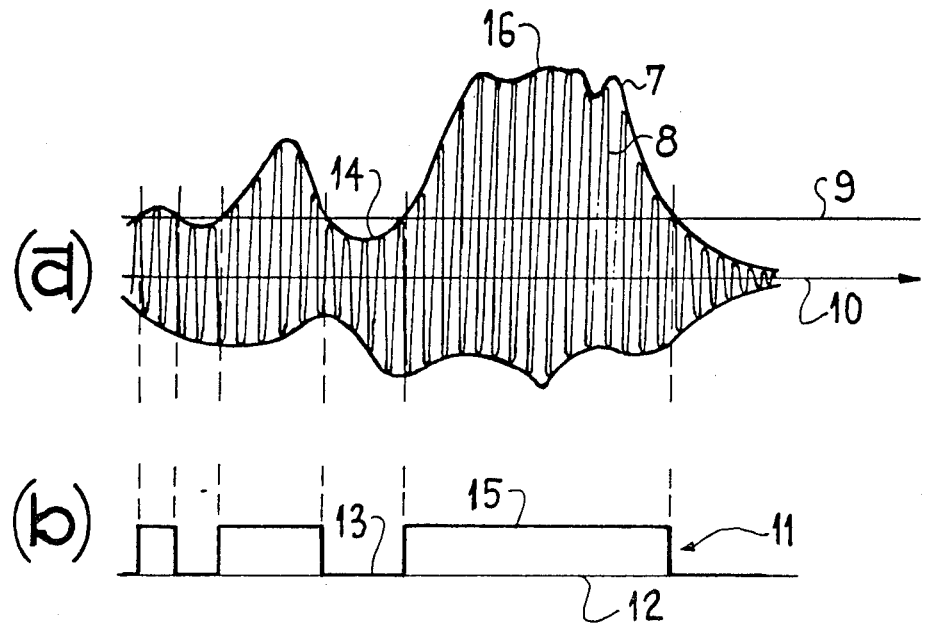

DEVICE FOR THE ACTIVATION OF AN APPARATUS FOR MEASURING ACOUSTIC EMISSION BY DETECTION OF BACKGROUND NOISE

This invention relates to a device for the activation of an apparatus which serves to measure acoustic emission by detection of background noise. The invention finds an application in the field of industrial control by acoustic emission.

In industrial installations subjected to high stresses, there exist a certain number of sound-generating phenomena in which sounds are propagated in structures and which are of two types:
percussion impacts of solid portions on stationary obstacles (detachment of turbine blade),
crack formation (in concrete blocks).

Different types of sounds or noises are also propagated in other frequency bands. Noteworthy examples are noises arising from the flow of fluids in piping systems, vibrations of unbalanced rotating parts, and so on. Systems for acquisition of data by acoustic emission must therefore store a large number of unnecessary data. In fact, in the example of a fluid circuit with a pump, the potential danger of projection of solid particles appears as critical only if the pump is in operation. In acquisition systems of the prior art, all that takes place prior to startup of the pump will be recorded without distinction.

In order to overcome this major drawback, the aim of this invention is to provide a device for the activation of an apparatus which serves to measure acoustic emission by detection of background noise. Said device carries out a continuous measurement of environmental background noise by means of piezoelectric transducers, compares said noise with a reference voltage within a comparator which then activates the measuring apparatus.

Other features of the invention will be more apparent upon consideration of the following description and accompanying drawings, wherein:

FIG. 1 is a diagram of a device according to the invention;

FIGS. 2a and 2b are two operating diagrams.

The device according to the invention as shown in FIG. 1 comprises a comparator 3 which receives at one input a reference voltage delivered by a control unit 4 and which receives at the other input a signal delivered by a circuit 2 for detecting electrical pulses produced by an acoustic emission transducer 1 which may also include a rectifier. This detection circuit 2 can consist of a mean noise-level integrator which serves to provide the positive peak envelope of the background noise or so-called noise level.

When the noise level is below the level of the reference which has been chosen, the comparator is at zero. When the noise level rises above the reference, the comparator changes state and initiates the operation of the measuring apparatus which then processes the signals received from the different transducers.

The increase in noise level is caused in particular by the commencement of a critical phase of operation of the installation which is being monitored. In the case of a fluid circuit, startup of the pump induces a background noise. This noise is detected by the circuit 2, then turns-on the comparator 3, and the control unit 4 delivers a suitably selected reference.

Referring now to FIG. 2a, this figure shows the zero voltage level 10, the background noise 8, the noise modulation 7 and the reference voltage 9. FIG. 2b shows the zero voltage level 12 and the response of the comparator 3 when the modulation 7 is higher than the reference 9, whereupon the comparator emits a signal. Thus the rectangular wave 15 is the response of the comparator 3 at the modulation peak 16.

In some instances, background noises other than the noise which serves to trigger the comparator may conceivably appear. In the example of a fluid circuit, the background noise which activates the measuring apparatus is the noise emitted by the pump. At some distance away and externally of the circuit, another background noise which appears at a sufficient level may reactivate the measuring apparatus. In order to forestall such an event, discrimination by spectral correlation is carried out by a circuit 2' prior to detection of modulation by the detector circuit 2. The acoustic emission frequency spectrum is in fact characteristic of the emission source to a large extent. It is therefore possible to select the access to the detection circuit only in respect of those background noises which are correlated with a predetermined reference spectrum.

The spectrum correlator can be connected to the input of the device downstream of the transducer 1 and can either enable or inhibit the detection circuit 2 via a special input of said circuit.

The data acquisition assembly 5 forms an integral part of the complete detection apparatus to which the activation device according to the invention is coupled. Said assembly comprises in particular a time base for acquisition of data which will then be processed in the processing assembly 6. The acquisition time base can thus be of the variable frequency type. Thus, when the activation device according to the invention does not detect any background noise which is capable of turning it on, that is to say when the noise level is below the predetermined critical threshold value or the reference unit 4, the acquisition time base produces a relatively low predetermined frequency f. By way of example, the data acquisition assembly 5 then carries out low-rate sampling of the signals derived from the transducer 1 at intervals of 1/f seconds. When a high noise level is recorded, the signal emitted by the comparator 3 switches the acquisition time base to an operating frequency F which is distinctly higher than the so-called watch frequency f. The sampling operation will then be much faster, namely at intervals of 1/F seconds. The flow of data to be processed is then increased by a marked extent.

The present invention therefore makes it possible to perform selective monitoring of various acoustic emissions in an industrial installation which may be of large size. This may be carried out as a function of predetermined hazard thresholds in order to limit the number of monitoring data collected by the transducer 1 when there is only a low degree of probability that these latter will be accident effects.

The activation device according to the invention can assume a number of different forms according to the various configurations of the apparatus for measuring acoustic emission. Thus, if the measuring apparatus comprises a large number of transducers whereas the installation under control has only a single source of noise which may become critical, the activation device according to the invention will be placed on only one of the transducers which is suitably chosen for the purpose. The other transducers will be directly connected to the assembly 5 for acquisition of data to be processed.

If a number of different background noises are indications of critical thresholds, the group of transducers can be arranged in separate subassemblies. One activation device and one data acquisition assembly 5 are associated with each transducer subassembly.

Furthermore, the present invention applies to different chains for the acquisition of data of acoustic origin. The transducer 1 may thus comprise a preamplifier in the event of long distances at the transducer location. The transducer 1 delivers electrical signals which can be rectified by a half-wave or full-wave rectifier device, for example of the semiconductor diode type.

What is claimed is:

1. A device for measuring acoustic emission, wherein said device comprises a detection circuit for detecting the background noise collected by transducers of the measuring apparatus; means for comparing the signal generated by said detection circuit with a reference voltage and producing an output signal when the comparison indicates that the background noise level has increased above a certain threshold level; and means for acquiring data at a first frequency, f, when no output signal is produced and when said output signal is produced acquiring data at a second frequency, F, greater than said first frequency, f.

2. A device according to claim 1 further including, a control unit for supplying said reference voltage to said comparing means.

3. A device according to claim 1, wherein each transducer further comprises a rectifier device.

4. A device according to claim 1, wherein the background noise detection circuit comprises a mean level integrator.

5. A device according to claim 4, wherein the background noise detection circuit comprises a correlator for receiving a signal which performs spectral discrimination.